(No Model.)   2 Sheets—Sheet 1.

C. HEMJE.
HOSE COUPLING.

No. 322,286.   Patented July 14, 1885.

Witnesses:
Albrecht Becher
Matthew Hendger

Inventor:
Charles Hemje.
S. W. Finsabaugh
atty (No Model.)  
2 Sheets—Sheet 2.

C. HEMJE.
HOSE COUPLING.

No. 322,286. Patented July 14, 1885.

Witnesses:
W. H. Scott
Albrecht Decker

Inventor:
Charles Hemje.

UNITED STATES PATENT OFFICE.

CHARLES HEMJE, OF WASHINGTON, DISTRICT OF COLUMBIA.

HOSE-COUPLING.

SPECIFICATION forming part of Letters Patent No. 322,286, dated July 14, 1885.

Application filed May 5, 1885. (No model.)

*To all whom it may concern:*

Be it known that I, CHARLES HEMJE, a citizen of the United States, residing at Washington, in the District of Columbia, have invented certain new and useful Improvements in Hose-Couplings, of which the following is a specification, reference being had therein to the accompanying drawings.

Figure 1:
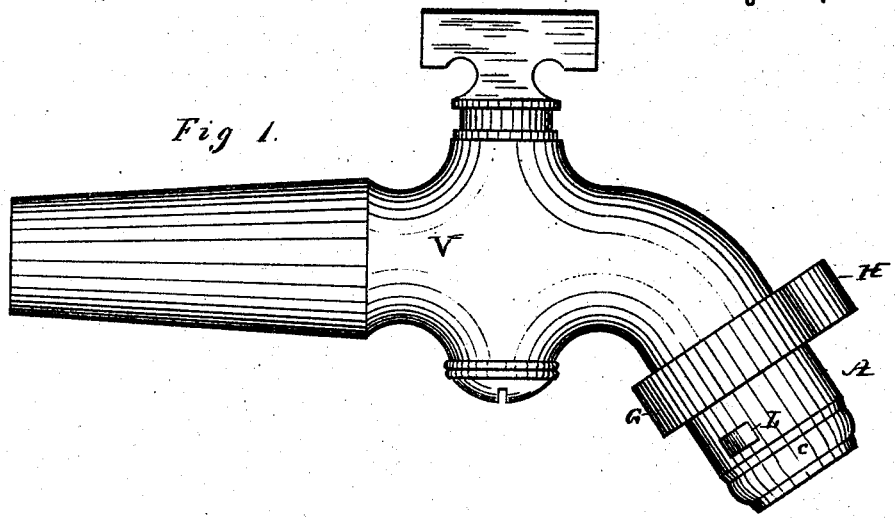
Figure 2:
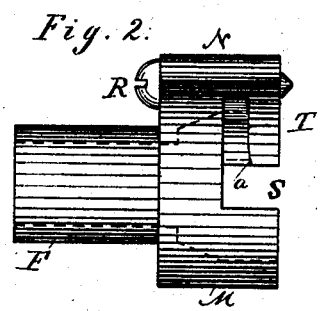
Figure 3:
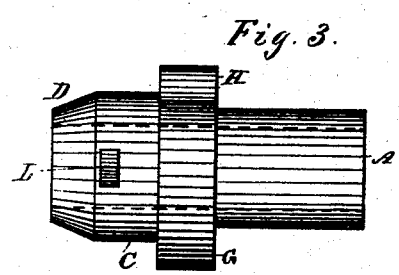
Figure 4:
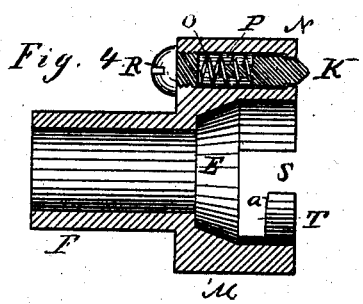
Figure 5:
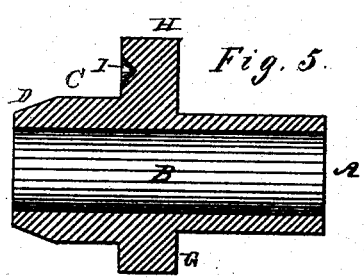
Figure 6:
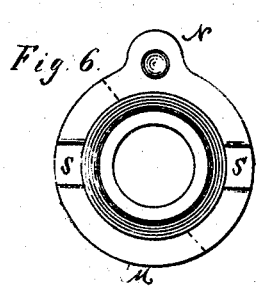
Figure 7:
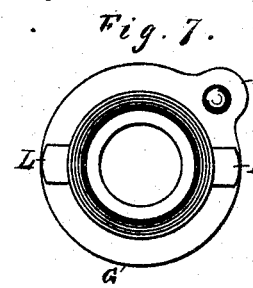
Figure 8:
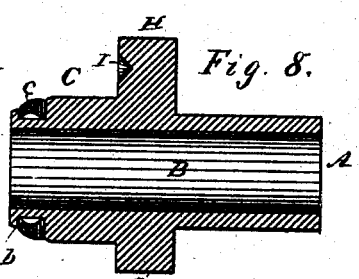
Figure 9:
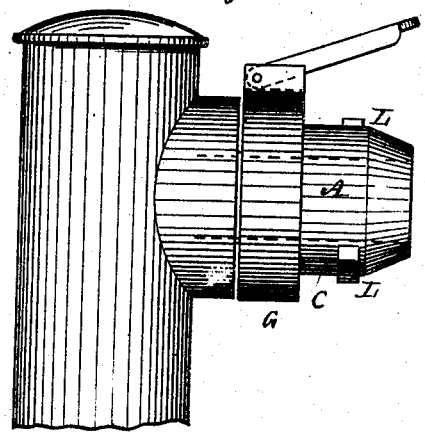
Figure 10:
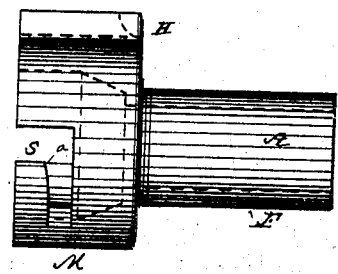
Figure 11:
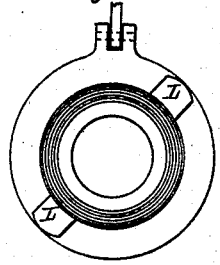
Figure 12:
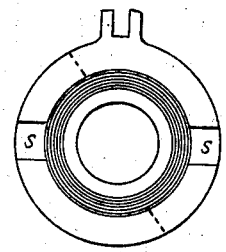
Figure 13:
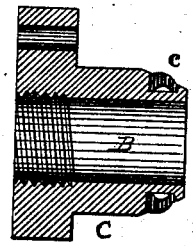
Figure 14:
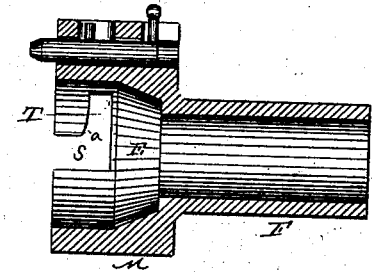

My invention relates to improvements in hose-couplings, the object of which is to provide a safe and reliable coupling which can be readily attached and detached, while at the same time it cannot be detached by jars or shocks or by longitudinal thrusts or pressures.
Referring to the drawings, Figure 1 is a side view of a faucet having the male portion of my improved coupling formed thereon. Fig. 2 is a side view of the female portion of my coupling. Fig. 3 is a side view of the male portion of my coupling as applied to a hose connection. Figs. 4 and 5 are sectional views of the devices shown in Figs. 2 and 3 and the fastening device. Fig. 6 is an end view of the female portion of the coupling. Fig. 7 is an end view of the male portion. Fig. 8 is a longitudinal sectional view of the male portion, in which is inserted a packing-ring. Fig. 9 is a side elevation of a hydrant having the male portion of the coupling attached thereto provided with a latch. Fig. 10 is a side elevation of the female portion of the coupling having the recess to receive the latch shown in Fig. 9. Figs. 11 and 12 are end views of the male and female portions of the couplings shown in Figs. 9 and 10. Figs. 13 and 14 are sectional vews of the male and female portions, showing a bolt adapted to be slid back and forth to lock the sections together.

A indicates the main body or section of the male portion of the coupling, having a central cavity, B, for the passage of the liquid. The front end of the section A is somewhat larger in diameter than the rear portion, as indicated at C, and is ground down, as shown at D, to snugly fit in the ground recess E, formed in the female section F, thus forming a tight joint.

The section A is provided with an enlarged annular portion, G, against which the enlarged end of the section F abuts, said annular portion G being provided with an enlarged portion or projection, H, having a cavity, I, to receive a spring-operated bolt, K, seated in the section F of the coupling. The section A is also provided with lugs L, adapted to fit in recesses formed in the section F, as will more fully appear hereinafter. The inner or coupling end of the section F is also provided with an enlarged annular portion, as shown at M, and, as before stated, is ground down true on its inner surface to receive the ground end D of the section A, the enlarged portion M being provided with a projection, N, corresponding to the projection H on the section A.

The projection N is provided with an aperture, O, to receive the bolt K, said bolt being held forward by the spring P, the tension of which can be regulated by the set-screw R.

The enlarged end of the section F is provided with longitudinal slots or openings S, which terminate in transverse slots T. The outer edges are made tapering or wedge-shaped, as shown at *a*.

When it is desired to couple the sections together, the end of section A is inserted in the end of section F, the lugs L entering the slots S, and when the sections are thus squarely brought into position the sections are turned partially in reverse direction, to bring the lugs into the transverse slots T, the inclined sides of which tend to draw the sections more closely together, and when the parts have been turned to the proper position the end of the bolt K will be thrown forward into engagement with the recess I, and thus prevent the parts from becoming detached.

In many instances it is not convenient or even possible to have the same sections as they were made or ground to match each other come together, or it may be, as in the case of the spigot, V, for beer-tanks and hydrant-connections, that the section F will not form a perfect joint with said spigot; and in order to secure a perfectly-tight joint at all times I form a recess or annular groove, *b*, in the end of the section A, and place therein a rubber packing-ring, *c*, which is concave on its inside and thicker at the rear end than it is at the front end, so that when the ends of the section are brought together the packing-ring will yield to the pressure, permitting the operator to couple the parts together, while the pressure of the packing-ring on the sides of the cavity E will prevent the escape of liquids, and thus form a tight joint.

For hydrant-connections, &c., the spigot shown in Fig. 1 will prove very effective and convenient, not only on account of the facility with which the hose can be attached and detached, but the projection H will serve as a support for buckets and other vessels having bails; and in such connections as the one just referred to I may dispense with the locking-bolt K and substitute therefor a latch pivoted in a slot or recess formed in the projection H and adapt the latch to rest in a recess formed in the projection N. This form of lock or fastening will prevent the parts from being turned, and thus hold the sections firmly together.

Having thus described my invention, what I claim, and desire to secure by Letters Patent, is—

1. A hose-coupling consisting of two sections, one section being ground tapering or cone shaped at its end and provided with lugs to fit a seat correspondingly ground and engage with recesses formed in the other section, said tapering or cone-shaped end being provided with an annular groove to receive a packing-ring which is concave on its inner side and convex on its outside, in combination with a suitable catch for holding the sections from lateral displacement.

2. In a hose-coupling, a rubber packing-ring having its inside concave and its outside convex, and adapted to fit in an annular groove or recess formed in the tapering or cone-shaped end of the male portion of the coupling, as set forth.

In testimony whereof I affix my signature in presence of two witnesses.

CHARLES HEMJE.

Witnesses:
 THOS. SMITH,
 MATTHEW HENDGES.